United States Patent [19]

Uematsu et al.

[11] Patent Number: 4,758,859
[45] Date of Patent: Jul. 19, 1988

[54] CONTROL APPARATUS FOR CAMERA

[75] Inventors: Kimio Uematsu; Naoki Tomino, both of Tokyo; Akira Ogasawara, Kawasaki, all of Japan

[73] Assignee: Nippon Kogaku K. K., Tokyo, Japan

[21] Appl. No.: 894,945

[22] Filed: Aug. 8, 1986

[30] Foreign Application Priority Data

| Aug. 13, 1985 | [JP] | Japan | 60-178418 |
| Aug. 13, 1985 | [JP] | Japan | 60-178419 |
| Aug. 13, 1985 | [JP] | Japan | 60-178420 |
| Sep. 20, 1985 | [JP] | Japan | 60-208475 |

[51] Int. Cl.$^4$ .......................... G03B 7/00; G03B 1/18
[52] U.S. Cl. .................................. 354/412; 354/204; 354/173.1; 354/448
[58] Field of Search ............... 354/412, 173.1, 173.11, 354/204, 205, 206, 209, 234.1, 235.1, 238.1, 267.1, 448

[56] References Cited

U.S. PATENT DOCUMENTS

| 4,017,875 | 4/1977 | Yamamichi | 354/209 |
| 4,322,152 | 3/1982 | Saton et al. | 354/204 |
| 4,372,661 | 2/1983 | Lange | 354/204 |
| 4,400,073 | 8/1983 | Tosaka et al. | 354/205 |
| 4,441,800 | 4/1984 | Nakano | 354/173.1 |
| 4,443,083 | 4/1984 | Nakano | 354/173.11 |
| 4,538,893 | 9/1985 | Nakano et al. | 354/173.11 |

Primary Examiner—Russell E. Adams
Attorney, Agent, or Firm—Shapiro and Shapiro

[57] ABSTRACT

A control apparatus for camera, comprises driving means comprising an electric motor, a circuit means for controlling the motor and a rotary shaft rotationally driven by the motor. The rotation of the rotary shaft includes a first rotation in a direction started in response to a picture-taking starting operation, a second rotation in a second direction started in response to the completion of an exposure and a third rotation in the second direction subsequent to the second rotation. The apparatus further includes a shutter-charging member movable from an initial position to a charge position in order to charge a shutter-driving mechanism; a mirror-operating member disposed to move a movable mirror between a position for through-finder observation and a position for exposure; a diaphragm-operating means for moving a diaphragm of a photographing lens between an open aperture position and a stop-down aperture position; a film feed member for taking up a film stepwise frame by frame; and an interlocking means for operationally connecting the shutter-charging member, mirror-operating member, diaphragm-operating member and film feed member with the rotary shaft and disposed to move the diaphragm to the stop-down position, the shutter-charging member to the initial position and the movable mirror to the exposure position during the first rotation of the rotary shaft, and, during the second rotation, to move the diaphragm to the open aperture position, the shutter-charging member to the charge position and the mirror to the through-finder observation position, and further, during the third rotation to take up the film.

21 Claims, 6 Drawing Sheets

CONTROL APPARATUS FOR CAMERA

BACKGROUND OF THE INVENTION

1. Field of the Invention

The present invention relates to a control apparatus for camera and more particularly relates to a control apparatus provided with an electric motor for driving a mechanism including a diaphragm device and a shutter device.

2. Related Background Art

In the art of the camera with built-in motor(s), many attempts have been made to realize a further reduction of size, weight and manufacturing cost of the camera. In order to attain the objects, it is desirable to use one and the same motor as a single driving source for all of the driving systems in the camera. In a prior art camera of the type in which a motor is used as a single driving source for all of the driving systems, there is generally provided an interlocking mechanism by which a film take-up mechanism and a shutter-charging mechanism are interlocked to drive the two different mechanisms in one and the same step.

Furthermore, in case of the single lens reflex camera having a turn-up mirror, three different mechanisms must be driven by a single motor at the same step. In this type of camera, the turn-up mirror is normally locked in the position for through-finder observation by a lock member. In a first step of an exposure operation, the turn-up mirror is released from the lock member's hold. A spring is used as a driving source for the turn-up mirror. Therefore, in addition to the driving of the above-mentioned film take-up mechanism and the shutter-charging mechanism, the spring for driving the turn-up mirror must be charged at the same step. In other words, three different mechanisms must be concurrently driven by a single motor during the same step.

As a matter of course, a large load is applied to the motor at the same time. To bear the large load, a high power motor must be used. The use of a large and high power motor naturally increases the consumption of electric current. This is against the purpose of a small size, light weight and power saving camera.

The problem which the prior art has tried to solve is, therefore, how to disperse the driving force and how to decrease the load on the single motor.

It has been found undesirable to drive the mirror system and the film take-up device by one and the same motor. In this case, one or more clutch mechanisms are needed, which renders the mechanism in the camera unduly complicate.

Regarding the aperture control, there are known many difficult problems. For example, when a flash light exposure is to be performed, it is necessary to preset an aperture value and a shutter time suitable for flash light exposure. This presetting operation is not only troublesome to the user of the camera but also leads to setting errors very often.

The presetting of an aperture value for flash light exposure is complicated further by the fact that the aperture value must be determined taking into account the guide number etc. of the flash device then used. Such a flash device has been known which is provided with the function to automatically adjust the intensity of the flash light by measuring the reflected light from the object. Even when one carries out a flash light exposure using such an automatic flash device, it is necessary to manually preset an aperture value considering the characteristics of the flash device. Moreover, it is required to preset an aperture value or change a preset aperture value in accordance with the sensitivity of the film then used. All of these setting operations trouble the users and lead them to setting errors.

The shutter mechanism also involves some problems. Recently, the driving system of the shutter mechanism has been simplified for the above-mentioned purpose. In this simplified type of shutter device, the shutter blades before running are anchored by a magnetic attraction. More specifically, there is used a shutter blade driving arm provided with a piece of iron which is directly attracted by an electromagnet to hold the shutter blades in the start position. To move the arm toward the electromagnet there is provided a charge member in the camera. Prior to exposure, the charge member must be retracted to a position apart from the arm. This retraction of the charge member often causes troubles. If the charge member is rapidly retracted, the arm can not be anchored well by the attraction of the electromagnet. In this case, the shutter blades accidentaly start running together with the charge member.

SUMMARY OF THE INVENTION

Accordingly, it is the primary object of the present invention to provide a camera which is small in size, light in weight and low in manufacturing cost and in which the output of a built-in motor is most effectively used.

It is another object of the invention to solve the problem of complicated operation as well as error in operation relating to the automatic aperture control.

It is a further object of the invention to enable improved control of the retraction speed of the shutter-charging member so that the problem of unstable holding of the shutter blade by the shutter-anchoring electromagnet can be eliminated.

Other objects, features and advantages of the invention will appear more fully from the following description taken in connection with accompanying drawings.

DESCRIPTION OF THE PREFERRED EMBODIMENTS

Figure 1:
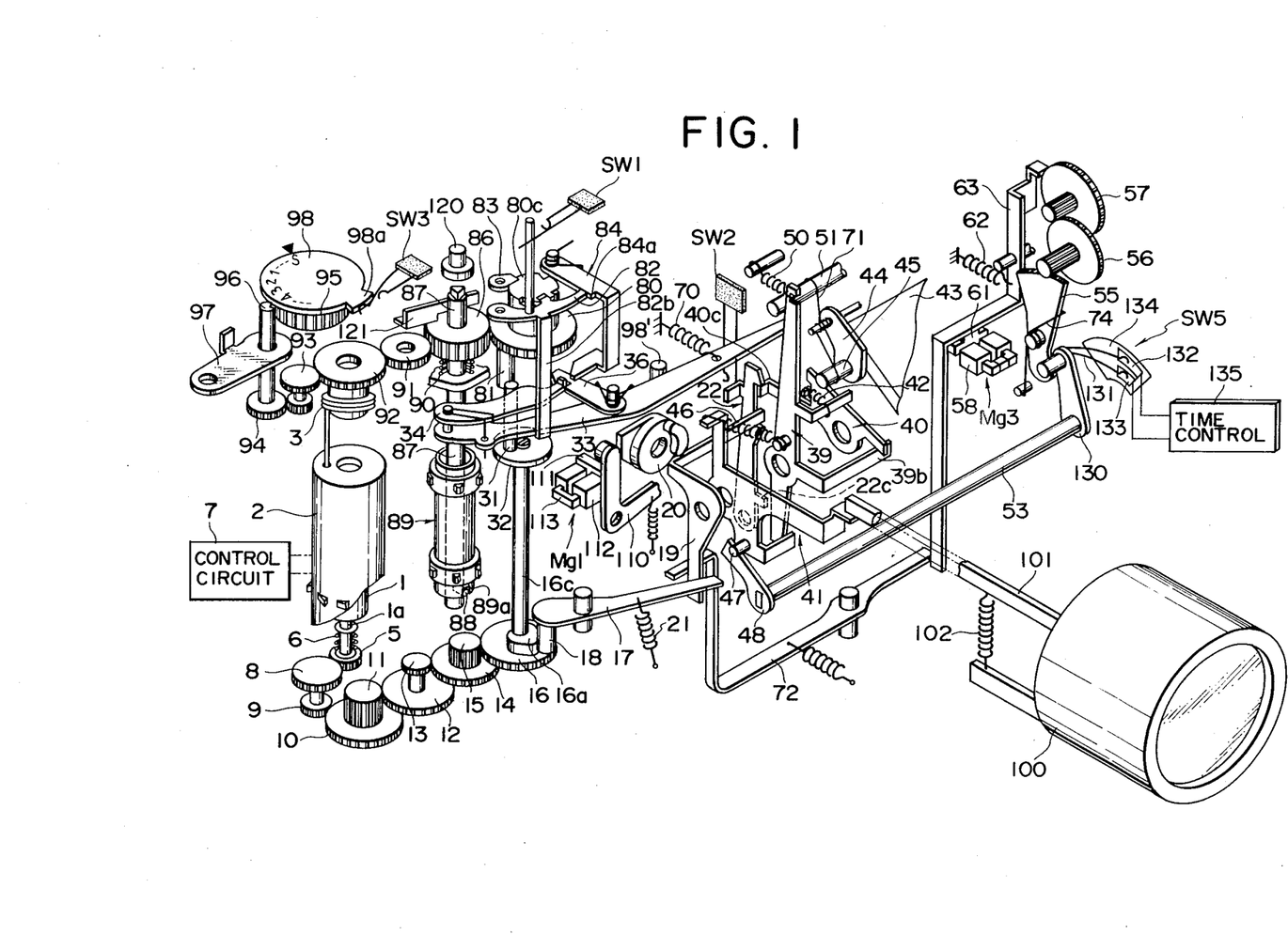
FIG. 1 is a schematic perspective view of a driving system of camera showing an embodiment of the invention.

FIG. 1 is a schematic perspective view of the internal mechanisms of a motor-driven camera in which the present invention has been embodied. All of the mechanisms in FIG. 1 are shown in the standard starting position after the completion of a film take-up operation and waiting for the next shutter release.

In the camera, a single motor 1 is used as the driving source for all of film take-up, aperture stop driving, shutter charging, mirror driving etc. The motor 1 is fixed on a base plate of the camera body not shown and encased in a film take-up spool 2.

The spool 2 is rotatably supported on the base plate not shown and at the upper end the spool 2 is in engagement with a spool friction spring 3 by which the spool 2 is driven to rotate about the motor in the manner described later.

The motor 1 has a rotation shaft 1a supporting a gear 5. The gear 5 is rotatable about the shaft 1a. But, normally the rotational torque of the motor 1 is transmitted to the gear as it is, owing to a slip mechanism comprising a compression coil spring 6 and a fastening washer. The rotation of the motor 1 is controlled by a control circuit 7.

The rotation of the motor transmitted from the gear 5 to a gear 16 is reduced by a reduction gear train 8, 9, 10, 11, 12, 13, 14 and 15.

The release of the camera is executed by a release button not shown. When the release button is depressed, electric power is supplied to a light-measuring circuit at a first stroke of the movement of the release button. When the release button is further depressed up to its second stroke, the motor is started rotating to execute a series of operations such as aperture setting, mirror-up and running of shutter blades sequentially.

For the purpose of this specification, the term "release of the camera" means an operation for starting the above sequential operations of the camera.

With the release of the camera, the motor 1 rotates at first reversely (clockwise rotation of the output shaft 1a) and a reference shaft 16c also rotates reversely (counter-clockwise). The reverse rotation angle of the reference shaft 16c is about 105°. By this reverse rotation a lever 41 is operated to drive a lens diaphragm (stop-down). At the same time, the reference shaft 16c charges a driving spring 42 for a turnable mirror 43. At the end point of the reverse rotation, the reference shaft 16c unlocks the mirror 43 to allow it to turn (mirror-up).

After a predetermined angle of rotation in the reverse direction, the motor 1 stops. After that, a first electromagnet Mg1 for controlling the shutter leading blades and a second electromagnet Mg2 (not shown) for controlling the shutter trailing blades are sequentially operated (magnetic erasing) to start the leading and trailing blades running at a determined interval. At the end of running of the trailing blades, a trailing blade running end signal is generated. In response to the signal, the motor 1 starts rotating forwardly (counter-clockwise). With this forward rotation of the motor 1, the reference shaft 16c also rotates forwardly to return to the reference or starting position (the position shown in FIG. 1). At this step, the mirror-driving system 22, 39, 40 and the diaphragm-driving system 41 are all returned to their starting position (FIG. 1). During this step of mirror-down, also charging of the shutter system 20, Mg1 and resetting of the aperture control magnet are executed.

Passing over the reference position, the reference shaft 16c continues rotating forwardly (clockwise). When the reference shaft has been forwardly rotated 360° relative to the reference position, one film take-up operation is completed. In this manner, according to the shown embodiment of the invention, the single motor 1 functions as the driving source for all of the driving systems of a camera such as diaphragm driving, mirror-up, shutter charging, and film take-up, making full use of the rotation of the motor not only in the forward direction but also in the reverse direction.

Hereinafter, the manner of operation of the reference shaft 16c will be described in further detail following the sequence of operations.

At first the operation for charging the shutter system will be described.

As previously described, the motor 1 starts rotating in reverse direction (clockwise) when the camera is relesed by a depression of the shutter button up to the second stroke. A driving force is transmitted to the reference gear 16 from the motor 1 through the reduction gear train 8-15. The reference gear 16 has a shutter-charging cam 16a formed thereon.

A roller 18 is kept in contact with the cam surface of the cam 16a. The roller 18 is a roller studded in a shutter-charging lever 17. In the reference position shown in FIG. 1, the lever 17 with the roller 18 is in contact with the largest lift rotation of the cam surface under the action of a spring 21. In this position, the lever 17 keeps a charge cam 20 in a shutter unit in the charged state through a lever 19 for charging the mirror-driving system 22, 39, 40. More particulaly, the charge cam 20 is kept in the position in which the cam 20 pushes one end of an arm 110 so as to push an iron piece 111 of the arm 110 against the yoke 113 of the electromagnet Mg1. Although not shown, the cam 20 is normally biased to clockwise rotation by a biasing spring. With the counter-clockwise rotation of the reference shaft 16c by the release of the camera, therefore, the shutter-charging lever 17 is rotated clockwise about its rotation axis along the cam surface. The lever 19 also rotates, following the lever 17, and moves to a retracted position beyond the operation angle of the charge cam 20. Since the electric current has already been supplied to the electromagnet Mg1, the iron piece 111 is held in the position attracted by the magnet Mg1 at the time.

As described later, a switch SW2 is switched ON by the reverse rotation of the motor 1. A determined time after the turn-ON of the switch, the current supply to the coil 112 of the magnet Mg1 is terminated and the arm 110 is released from the magnet's hold. Now, the arm is rotated clockwise by a spring and the shutter leading blades start running. After lapse of a determined time (exposure time), the current supply to the second magnet Mg2 is terminated to allow the shutter trailing blades to run.

In the above-described manner, the film exposure step is completed. In response to a trailing blade running end signal, the motor 1 now starts rotating forwardly to rotate the reference shaft 16c forwardly (clockwise). Thereby a mirror-down step begins.

At this step, the shutter-charging lever 17 is forcedly rotated counter-clockwise by the cam 16a. Through the lever 19, the charge cam 20 is also rotated counter-clockwise. The cam pushes the arm 110 to keep the iron piece 111 in contact with the magnet Mg1. In this manner, the driving part for the shutter leading blades is reset to the charged position. Resetting of the driving part for the shutter trailing blades is performed in a similar manner. Thus, the shutter charge is completed.

Secondly, the driving system for the mirror and the diaphragm will be described.

The reference shaft 16c has a disk 32 fixed at the end opposite end to the gear 16. The disk has a stud pin 31.

A mirror-driving lever 33 and a swing lever 34 are coaxially and rotatably supported on a shaft on the base plate of the camera body not shown. The mirror-driving lever 33 is biased to clockwise rotation and the swing lever 34 to counter-clockwise rotation by a spring. A lock lever 36 is supported on the lever 33 for rotation about a pivot. The lock lever 36 is biased to counter-clockwise rotation by a spring. In the free end of the lever 36 there is formed a cutout in which the tip end of the swing lever 34 is engaged. These three levers 33, 34, 36 form a triangle.

The free end of the lever 33 is in engagement with one end of a lever 39. When the lever 39 is rotated clockwise by the lever 33, the mirror-driving system is driven.

When the reference shaft 16c is rotated counter-clockwise with the release of the camera in the manner described above, the pin 31 also rotates counter-clockwisely. Since the pin 31 is in contact with the cam surface of the lever 34, the latter is rotated clockwise by the counter-clockwise rotation of the reference shaft 16c. Since, as described above, the levers 33 and 34 are connected through the lever 36, the triangle formed by the three levers 33, 34, 36 is rotated clockwise at the same time.

In this manner, the rotational motion of the pin 31 is converted into a rocking motion by the three levers 33, 34 and 36 and also the stroke of the motion is expanded at the same time. This rocking motion with an expanded stroke rotates the driving lever 39 clockwise this ever being mounted on a side wall of the mirror box.

The mirror-driving lever 39 is rotatably mounted on a shaft fixed on the base plate constituting a part of the mirror box not shown in FIG. 1. On the same shaft, a mirror-up lever 40, an aperture control lever 41 and the previously mentioned charge lever 19 are also mounted for rotation independently of each other about the shaft.

Between the mirror-up lever 40 and the mirror-driving lever 39 there is disposed a bias spring 42 which tends to rotate the lever 40 clockwise. However, the lever 40 is held in the starting position by one end 39b of the lever 39 against the biasing force of the spring 42.

The turnable mirror 43 is normally in a turndown position. In other words, before the release of the camera, the mirror 43 is in a position 45° tilted relative to the light path for picture taking in front of the film plane. After the diaphragm has been moved to a determined aperture value, the mirror 43 is turned up to a position retracted from the picture taking light path.

The mirror-holding frame 44 has a pin 45 fixed thereto. The turn-up of the mirror 43 is performed when the pin 45 is pushed up by the lever 40. In the starting position before the release of the camera, a determined space is kept between the lever 40 and the pin 45. In this starting position, also the angled portion 40c of the lever 40 is in engagement with a pawl of the lock lever 22. Therefore, even when the mirror-driving lever 39 is rotated (clockwise), the mirror-up lever 40 can maintain its starting position until the last step of the rotation course.

Disposed between the aperture control lever 41 and the mirror-driving lever 39 is a driving spring 46 which tends to rotate the lever 41 clockwise. However, in the position before the release of the camera, the lower end of the lever 39 is in engagement with the lower end of the lever 41 to keep the latter in the open aperture position.

100 denotes an interchangeable lens mounted on the camera. 101 denotes a lever interlockingly connected with a diaphragm mechanism (not shown) within the interchangeable lens 100.

In the above-shown starting position, the lever 41 hinders the interlocking lever 101 from moving down, thereby keeping the diaphragm in the open aperture position. In this embodiment, the lever 101 is under the action of a spring 102 which tends to move the lever 101 downwardly, that is, in the direction for stopping down the aperture.

The lever 41 has also a pin 47 engaging with a lever 48. The function of the lever 48 is to expand the motion of the lever 41. On the other side, the lever 48 is connected to a locking mechanism 55–63.

The mechanism for charging the shutter has already been described. Hereinafter, a further description will be made of the mechanism for driving the shutter.

The shutter device used in the embodiment includes two electromagnets Mg1 and Mg2 for holding the shutter leading blades and the shutter trailing blades respectively (Mg2 is not shown). The leading blades are supported by a first arm 110 and the trailing blades by a second arm (not shown). The first arm has a piece of iron which is attracted by the first magnet Mg1 and the second arm also a piece of iron which is attracted by the second electromagnet Mg2. In this manner, the leading and trailing blades of the shutter are held in the charged position by the attraction forces of the electromagnets Mg1 and Mg2.

After mirror-up, the first and second magnets are deenergized to allow the leading blades and the trailing blades to start running sequentially at a desired time interval for performing an exposure with a selected slit width.

In the charged position shown in FIG. 1, as previously mentioned, the charge cam 20 is being biased to clockwise rotation by a spring not shown. The arm 110 has been rotated to the shown starting position before running by the difference in lift on the cam surface of the cam 20.

On one arm end, the arm 110 has a set of shutter leading blades not shown and forms a four link mechanism with the blades to open and close the exposure aperture which the light transmitted from the lens 100 passes through. In the shown embodiment, the arm 110 is always biased to clockwise rotation. The direction in which the shutter blades are driven during running is from above to under.

The leading blade-supporting arm 110 is held in the charged position by the charge lever 19 through the cam 20. As previously mentioned, the charge lever 19 is locked in the position by the lever 17 at one end and by another locking means at the other end. Although not shown, the trailing blade-supporting arm has the same structure as that of the leading blade-supporting arm 110.

Another locking means mentioned above is a pawl of the lock lever 22 which holds the other end of the charge lever 19 in the shutter-charged position. As previously mentioned, the charge lever 19 is rotated to the reference position by the cam 16a on the reference shaft and is held in the reference position. In this reference position, some space is provided vertically between the pawl of the lock lever 22 and the charge lever 19 as will be described hereinafter in further detail with reference to FIG. 2.

Figure 2:
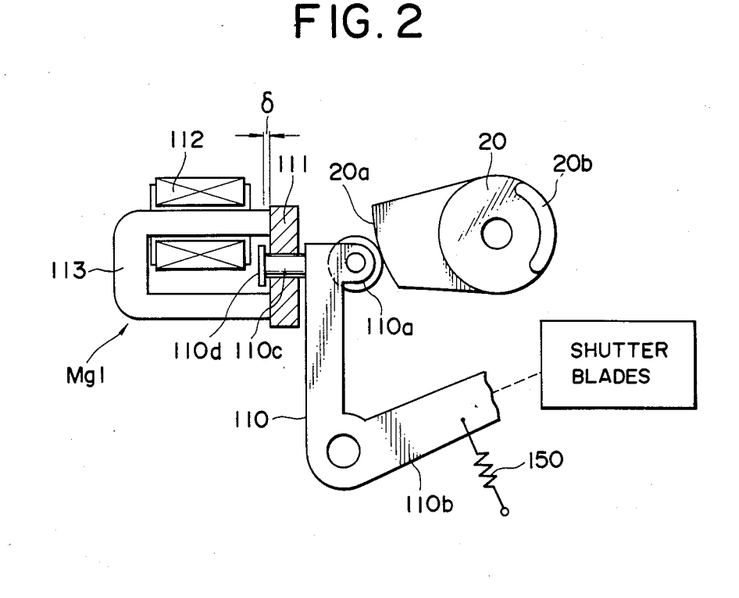
FIG. 2 is a plan view of the shutter-driving system of the embodiment.

FIG. 2 is an enlarged, detailed view of the shutter system 20, 110 and the shutter blade holding magnet Mg1.

Referring to FIG. 2, the arm 110 has a shaft 110c on one arm end. The iron piece 111 is mounted on the shaft 110c for slide movement along the shaft. At the fore end, the shaft 110c has a flange 110d against which the iron piece 111 is biased by a spring not shown. When the arm 110 has been rotated counter-clockwise to the reference position shown in FIG. 1, a small space ($\delta$) is formed between the flange 110d and the iron piece 111. In this manner, when the roller 110a is pushed by the cam surface 20a of the cam 20 and the iron piece 111 is pressed against the yoke 113, only the arm 110 is slightly over-charged. The above-mentioned space between the charge lever 119 and the pawl of the lock lever 22 is a little larger than the space ($\delta$) between the flange 110d and the iron piece.

The lock lever 22 continues to lock the mirror-up lever 40 and the charge lever 19 until the driving lever 39 reaches the last step of the driving course.

A moving contact of a switch SW2 is in contact with the lever 22. The moving contact has a biasing force tending to rotate the lever 22 clockwise. The reverse rotation of the motor 1 for driving the mirror-driving system is stopped by the switch SW2. A spring 50 biases the lever 39 to counter-clockwise rotation. But, the lever 39 is positioned by a stop pin 51.

Until the step of mirror-up, the mirror and diaphragm driving system operates in the following manner.

With the reverse rotation of the motor 1 by the release of the camera, the reference shaft 16c rotates counter-clockwise. The pin 31 on the reference shaft rotates the lever 33 clockwise, by which the lever 39 is rotated clockwise. With the clockwise rotation of the lever 39, the springs 42 and 46 are charged and, following this, the levers 40 and 42 begin rotating also clockwise. However, the rotation of the lever 40 is soon stopped by the pawl of the lock lever 22. The rotation angle of the lever 40 allowed at the time is smaller than the space between the lever 40 and the pin 45. Therefore, the mirror 43 has not been rotated yet. On the other hand, the clockwise rotation of the lever 41 moves the diaphragm-interlocking lever 101 downwardly to gradually stop down the aperture by the diaphragm within the lens 100.

Through the engagement with the pin 47 on the lever 41, the lever 48 is rotated counter-clockwise. The lever 48 is connected with a gear train 55, 56, 57 through the driving shaft 53 on the opposite side to the mirror. The gear train expands the rotation of the aperture control lever.

The last gear 57 of the gear train is formed as a ratchet in which a pawl 63 can be engaged to terminate the aperture stop-down motion. In this manner, a desired aperture value is set.

The manner of operation for setting a desired aperture value will be further described hereinafter.

Although not shown, a photosensor device receives the light transmitted from the lens 100 through the turnable mirror 43 to measure the intensity of the light. From the measured light intensity and the information of the film sensitivity, a selection circuit not shown selects a combination of shutter time and aperture value which is expected to give the optimum exposure under the given conditions. When the aperture has been stopped down just to the selected proper aperture value, it is detected by an aperture control circuit which then starts a current supply to a coil 58 of a combination magnet Mg3. At the time, the attraction force of a permanent magnet of the combination magnet Mg3 by which an armature 61 has been held on the magnet is overcome by the biasing force of a spring 62 tending to rotate clockwise the above-mentioned pawl member 63 to which the armature is fixed. As a result, the pawl member 63 with the armature 61 is rotated clockwise so that the pawl is engaged in the ratchet gear 57 to stop it. Thus, the expansion gear train 55-57, the driving shaft 53 and the lever 41 are all stopped and the motion for aperture stop-down is terminated just at the desired aperture value. In this manner, the aperture is set to an optimum aperture value.

Regardless of the stopping of the lever 41, the mirror-driving lever 39 rotates at least by a rotation angle corresponding to the stroke of the lever 101 required to stop down the aperture to the minimum aperture value. Rotating by this angle, the lever 39 comes in contact with a projection 22c of the lock lever 22. As the lever 39 rotates further, the lock lever 22 is rotated counter-clockwise. Therefore, both the springs 46 and 42 are charged by the rotation of the lever 39 after the stop of the lever 41 by the actuation of the pawl 63 in the course of aperture stop-down.

As the lock lever 22 is rotated counter-clockwise by the lever 39, the mirror-up lever 40 and the charge lever 19 are unlocked and a short time after the switch SW2 is turned ON to stop the motor 1. The mirror-up lever 40 is rotated clockwise by the spring 42 in which a sufficient amount of spring force has been stored. Consequently, the pin 45 is pushed up and the mirror 43 is turned up to the retracted position from the picture light path.

At the time, the charge lever 19 rotates counter-clockwise from the position shown in FIG. 1. With it also the cam 20 rotates clockwise until the rotation is stopped by a stop not shown. In this phase of operation, the motor 1 remains stopped and the lever 33 is stopped in the position to which it has been previously rotated clockwise by the pin 31. Therefore, the mirror remains in the position turned up and the aperture in the position stopped down. The stop point of the motor 1 in this state is a point at which the pin 31 is near the top dead center for driving the lever 33.

In addition to the function to stop the reverse rotation of the motor 1, the switch SW2 has the following two functions:

Firstly, the switch SW2 functions as a trigger switch to trigger a timer circuit not shown. The leading shutter blades are started a determined time after he timer circuit is triggered by the turn-ON of the switch SW2. The determined time is a sum of the turn-up time of the mirror 43 and a suitable allowance time.

Secondly, it functions also as a memory switch useful for remeasurement of light. As previously mentioned, the depression of the release button up to the first stroke closes the switch for the power source and the light measuring circuit in the camera. An output of light measurement is obtained which corresopnds to the intensity of the light transmitted through the aperture of the lens. In accordance with the light measurement output, a combination of aperture value and shutter time is determined before the release of the camera. The camera is then released by depressing the release button further to the second stroke. After this release of the camera, an electric current is supplied to the coil 58 to set the aperture to the selected aperture value. After that, the light transmitted through the set aperture is again measured. This is the remeasurement of light. The remeasured value of the light intensity is memorized to check whether the set aperture is wrong or good. If wrong, the error is compensated by shutter time. In this manner, the value for film exposure is controlled to an optimum one.

As described above, the switch SW2 functions also as a memory switch to memorize the measured value of light intensity after an aperture control has been made. Of course, it takes a certain time from the end of the aperture control to the completion of memorization of the remeasurement output of the light through the controlled aperture. For the purpose of explanation, we call this "light remeasurement time". The light remeasurement time must be set to a value larger than the sum of (a) the time required for the decay of the bounce of the diaphragm after it is stopped at the controlled aperture value and (b) the time required to correctly store in a condenser the obtained signal of the remeasurement of the light through the controlled aperture.

In the prior art camera, two mechanical delay means (such as a fly-wheel) have been required to obtain the light remeasurement time. One of the two delay means has been used to drive the diaphragm at a moderate, controllable speed. The other has been used to gain the time up to the start of mirror-up. The time difference between the two delay mechanisms, that is the time from the completion of aperture stop-down to the start of mirror-up has been used as the light remeasurement time in the prior art system.

As compared with the prior art, the above embodiment of the invention has an advantage that the light remeasurement time can be obtained without any particular delay device. In the embodiment of the invention, as described above, after the completion of aperture stop-down by the motor 1, the same motor is used to turn the mirror-up. One of the important features of the present invention is found in this point.

In the above embodiment, the motor 1 drives the diaphragm while charging the spring 42 at the same time. Furthermore, at the last step of this driving movement (after the lever 39 has been moved to the position for the minimum aperture value after completing the stop-down of aperture), the motor 1 itself releases the turnable mirror 43 from the lock. Thus, the motor is used as the sole driving source for all of the driving systems while using the same motor as delay means at the same time. The energy otherwise required to move a particular delay means such as a fly-wheel is unnecessary for the embodiment of the present invention.

Rather, according to the invention, the driving energy can be used more effectively. As a delay member such as a fly-wheel is not needed, a further simplification of the mechanism can be realized, which will lead to a substantial cost reduction.

Hereinafter, a description will be provide of the retraction of the shutter-charging lever and the current supply to the electromagnets Mg1 and Mg2 for holding the shutter leading blades and the shutter trailing blades. The second electromagnet Mg2 is not shown in the drawing.

In response to a release signal generated by the release of the camera, electric currents are supplied to the shutter blade-holding magnets Mg1 and Mg2. Iron piece 111 is electromagnetically anchored. In this state, the shutter blades can not start running even when they are released from the mechanical hold by the charge cam 20.

As previously shown in FIG. 2, the arm 110 is so designed as to provide a small space ($\delta$) between its flange 110d and the iron piece 111. This space ($\delta$) serves to absorb some possible overcharge when the iron piece 111 is pressed against the iron core 113 of the magnet Mg1 by the charge cam 20. However, in the prior art apparatus, this space ($\delta$) has often produced a problem. The problem is that when the charge cam 20 is rapidly retracted from the position shown in FIG. 2, the shutter blades accidentally start running. This trouble is caused in the following manner:

When the charge cam 20 is retracted, the arm 110 pulls back the shaft 110c under the action of the spring. This pulling of the shaft is impetuously done because of the existence of the space ($\delta$). An impact is applied to the iron piece 111 held by the magnet Mg1 at that time. The attraction force of the magnet is easily overcome by such an impact. As a result, the shutter blades are unintentionally released from the electromagnetic hold and accidentally start running.

The problem may be solved by increasing the attraction of the electromagnet. But, this means the use of a larger magnet and a larger current supply to the magnet, which is against the desire for a small and power-saving type camera. Another possible solution is to reduce the impact (speed) with which the flange 110d strikes against the iron piece 111. However, this solution is not so effective for the camera provided with this type of shutter device. In this type of shutter device, a locking pawl is generally used to lock the arm in the charged state. For mechanical and structural reasons, such a locking pawl usually can not be unlocked gently, but is unlocked in an abrupt manner. If the locking pawl is designed in such manner as to have a slope from the lock point to the unlock point at the tip end of the pawl, the charge member may be retracted gradually and the unlocking may be done gently. However, in general, the unlocking speed of the locking pawl is too high for such a solution to be effective.

In this embodiment of the present invention, the problem has been solved in a very effective manner by employing a particular design on the cam surface of the cam 16a.

The cam surface of the cam 16a is so designed that the cam 16a carries out a shutter charge (an operation for pushing the iron piece 111 against the magnet Mg1); at the position in which the cam lift is the highest (the position shown in FIG. 1), the cam 16a holds the charge cam 20 in the position through levers 17 and 19; and at the phase of retraction (clockwise rotation) of the cam, the roller 18 slowly and gently lowers following the cam surface. Therefore, the speed at which the iron piece 111 and the flange 110d contact with each other can be controlled to any desired value so that the problem of failure to hold the shutter blades by the electromagnets can be solved completely.

A further description will be provided of the cam 16a with reference to FIG. 1.

When the reference shaft 16c rotates reversely (or forwardly) by a certain unit rotational angle from the reference position shown in FIG. 1, an amount of cam lift is given by the cam surface of the cam 16a. When the refrence shaft 16c rotates further reversely (or forwardly) by a unit rotational angle after that (after more than 10° rotation from the reference position in FIG. 1), an amount of cam lift is given by the cam surface. In this embodiment, the cam surface is so designed that the first mentioned cam lift is smaller than the second mentioned cam lift.

Since the cam surface of the cam 16a is designed in the manner described above, with the rotation of the cam 16a at a constant speed reversely (forwardly) from the reference position shown in FIG. 1, the cam surface 20a (FIG. 2) of the cam 20 is slowly retracted from the roller 110a. Accordingly, until the flange 110d comes into contact with the iron piece 111, the arm 110 moves at a lower speed than the moving speed of the same arm 110 after the flange 110d has come in contact with the iron piece 111.

In this embodiment, the lever 22 has a mechanical locking pawl. In the driving mechanism, the mirror-up, shutter charge and film take-up are performed making use of the forward and reverse rotations of the single motor 1. For shutter charge, the cam 16a is usually rotated in the reverse direction to move the charge lever 17. Further, for film take-up, the cam rotates one revolution in the forward direction thereby moving the charge lever. During the film take-up, the locking pawl of the lever 22 locks the charge lever 19 in the position to prevent the latter from following the movement of the charge lever 17. However, it is to be noted that between the charge lever 19 and the lock lever 22 there is provided some space which is, as previously mentioned, larger than the overcharge stroke ($\delta$) of the arm 110. Therefore, the lever 19 and the locking pawl can come into engagement with each other after the iron piece 111 and the flange 110d of the arm 110 have come in contact with each other.

After the completion of mirror-up, the shutter blades are allowed to start running. To this end, as previously described, the current to the leading blade-holding magnet is cut off first and then the current to the trailing blade-holding magnet is cut off by a circuit not shown, at a good timing for obtaining the desired shutter time.

Hereinafter, the manner of operation after the completion of the shutter relasing will be described in detail.

In response to a trailing blade running end signal, a switch (not shown) is closed to start the rotation of the motor 1 in the forward direction. With the forward rotation of the motor, the step of mirror-down is carried out by the mirror-driving system 22, 39, 40. As the motor 1 rotates forwardly, the reference shaft 16c and the pin 31 on the disk 32 of the reference shaft also rotate forwardly (clockwise). The triangle which the mirror-driving lever 33 forms together with the lever 34 and 36 rotates counter-clockwise following the pin 31 under the action of the spring 70. Accordingly, the lever 39 also turns back following the lever 33 by the spring 50. The mirror-up lever 40 and the aperture control lever 41 rotate together counter-clockwise. With the counter-clockwise rotation of the lever 40, the mirror 43 is turned down by the spring 71. The counter-clockwise rotation of the lever 41, on the other hand, raises up the diaphragm-interlocking lever 101 to open the aperture.

The spring force of the spring 50 is so determined that it can return the mirror-driving system 22, 39, 40 while charging the diaphragm-driving spring 102 in the lens 100 at the same time.

With the forward (clockwise) rotation of the reference shaft 16c, the shutter-charging lever 17 is rotated counter-clockwise by the cam 16a. The lever 19 pushes the projection 20b (FIG. 2) of the cam 20 to rotate the cam counter-clockwise. Thereby the shutter system 20, Mg1 is brought into the charged position shown in FIG. 1. Since the lever 19 is in engagement with one end of a reset lever 72, the clockwise rotation of the former causes the latter to rotate also clockwise.

At the other end, the reset lever 72 is in engagement with the diaphragm-locking pawl 63. With the clockwise rotation of the reset lever 72, the pawl 63 rotates counter-clockwise against the biasing force of a spring 62.

Thus, the pawl 63 is disengaged from the ratchet gear 57. At the same time, the armature 61 is moved against the combination magnet Mg3 and held by the attraction of the magnet. The expansion gear system 55, 56, 57 is now unlocked from the pawl 63 and is turned back by the return spring 74 up to the position in which the lever 48 comes in contact with the pin 47. Thus, the system takes the position shown in FIG. 1 (the open aperture position) and is ready for the next release of the camera.

In this embodiment, for the purpose of simple explanation, the mechanism for resetting the aperture control system has been shown in a simplified form. The manner of operation of the resetting system has been described only by the reset lever 72. However, it is to be noted that the function of the resetting system can not completely be satisfied by the reset lever 72 only. Although not shown, between the reset lever 72 and the locking pawl 63 there must be provided, in practice, a mechanism for rotating the pawl 63 clockwise when the lever 72 is rotated clockwise. In the above, the manner of operation for resetting has been shown and described schematically only to illustrate the disengagement of the locking pawl 63 by the shutter-charging lever 17 and the holding of the pawl 63 by the combination magnet Mg3 during the step of mirror-down. Other necessary mechanism and members for resetting have been omitted.

The reference shaft 16c which has been rotated reversely at the step of mirror-up, rotates forwardly at this resetting step as described above. When the reference shaft has rotated back to the starting reference position, the mirror-down, the shutter charging and the resetting of the aperture control system are all completed.

Subsequent to the above resetting step, the step of film take-up is carried out. The manner of this operation will be described hereinafter.

After completing the above steps, the motor 1 does not stop at the reference position, but continues to further rotate passing over the reference position to perform the step of film take-up by one revolution (360°) of the reference shaft. The reference shaft 16c is a shaft extending from the top wall to the bottom wall of the camera and its bearings are provided on the camera body (not shown). A take-up gear 80 is mounted coaxially with the reference shaft 16c. The shaft of the gear 80 is rotatably supported on the base plate of the camera.

Figure 3:
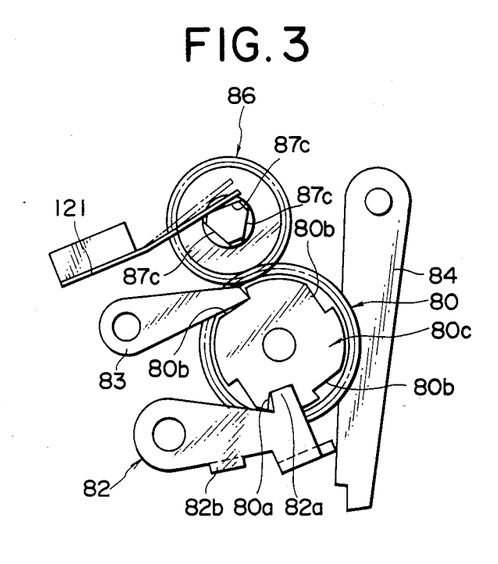
FIG. 3 is a plan view of the film take-up system of the embodiment.

The upper surface of the gear 80 is shown in enlarged view in FIG. 3. As seen, the gear 80 has a cylindrical part 80c on the upper surface. The diameter of the cylindrical part 80c is smaller than the outer diameter of the gear 80. On the circumference of the cylindrical part 80c there are formed a notch 80a and four cutouts 80b.

A take-up limiting lever 82 has a pawl 82a which can engage in the notch 80a. In the cutouts 80b, a reverse-preventing pawl 83 is engageable. The reference position before the release of the camera is determined by the lever 82.

On the under-surface the gear 80 has a stud pin 81 (see FIG. 1) which is in engagement with a stud pin 31 on the disk 32. The two pins 81 and 31 are in engagement with each other on the same radius. With the release of the camera, the pin 31 rotates reversely (counter-clockwise). But, this reverse rotation of the pin 31 has no effect on the take-up gear 80.

One end 82b of the lever 82 is curved downwardly and engageable with the mirror-driving lever 33. When the lever 33 rotates clockwise, therefore, the lever 82 is also rotated clockwise. With the clockwise rotation, the lever 82 is disengaged from the take-up gear 80 and the tip end of the lever 82 falls in a catch portion 84a of the locking lever 84. Therefore, when the reference shaft 16c rotates in the forward rotation mode passing over the reference position to initiate the step of film take-up, the reference pin 31 can rotate the take-up gear 80 and thereby also the gear train 86, 91 to 94. The gear 86 rotates together with a sprocket shaft 87 having a stud pin 88 at the lower end. The rotation of the sprocket shaft 87 is transmitted to a sprocket 89 through the pin 88 which cooperates with a groove 89a on the lower circumference of the sprocket to form a clutch.

The sprocket shaft 87 is movable in the longitudinal direction (up-and-down). By a moving-down of the sprocket shaft 87, the clutch 88, 89a is disengaged and the sprocket 89 is made free. The sprocket shaft is always under the force of a spring 90 which tends to move the sprocket shaft upwardly. So long as the sprocket shaft 87 is in a position moved up by the spring, the clutch 88, 89a is in engagement.

The rotation of the take-up gear 80 is transmitted to the spool gear 92 through the sprocket gear 86 and the idle gear 91. The spool gear 92 has, at its center, a hollow shaft which is rotatably supported on the base plate of the camera. Through a spool friction mechanism formed by a spring 3, the spool gear is connected with a film spool 2.

Through an idle gear 93, the spool gear 92 is in mesh with the gear 94 which is rotated one revolution by one revolution of the take-up gear 80. The gear 94 has a Geneva gear 96 at the top end. The Geneva gear 96 is engageable with a ratchet gear 95 having a film counter dial 98 integrally formed with it. By one revolution of the Geneva gear, the film counter dial 98 is rotated by one frame.

The Geneva gear 96 is brought into engagement with the ratchet gear 95 by a lever 97 interlocked with the opening and closing of the back lid of the camera. When the camera back lid is closed, the lever 97 pushes the Geneva gear in the ratchet gear. When the back lid is opened, the lever 97 disengages the Geneva gear from the ratchet and resets the film counter dial 98 to the starting position shown in FIG. 1 under the action of a return spring (not shown).

The counter dial 98 has a cam portion 98a with which a counter switch SW3 is in contact. During the take-up of the film leader part from frame indication "S" to "1", the switch SW3 is kept closed (ON). During this film leader take-up, the motor rotates continuously (forwardly or backwardly) until the first frame of the film reaches the exposure position. Also, during this take-up step, the shutter leading and trailing blades are held in charged state by the holding magnets Mg1 and Mg2 through a circuit not shown. Therefore, the shutter blades cannot move.

The ordinary film take-up after every exposure is performed in the following manner:

In the course of the clockwise rotation with the pin 31, the pin 81 comes into contact with a sloped portion at the free end of the lever 36. Thereby the lever 36 is rotated clockwise and disengaged from the lever 34. After this time point, the lever 34 is alone rotated further by a further rotation of the take-up gear 80. The lever 33 is kept stopped by a stop 98'.

The pin 81 comes into contact also with the tip end of the locking lever 84 nearly at the same time as the contact of the pin 81 with the end 36b of the lever 36. The lever 84 is rotated counter-clockwise by the pin 81 and the take-up limiting lever 82 is released from the lock portion 84a of the lever 84. Now, the lever 82 is rotated counter-clockwise by the moving contact of the switch SW1. When the take-up gear 80 has rotated one revolution and the film feed by one frame has been finished, the pawl 82a of the lever 82 engages in the notch 80a of the gear 80. Thus, the rotation of the gear 80 is stopped. At the time, the switch SW1 is closed (ON) to stop the forward rotation of the motor 1.

In this manner, a series of operations from the release of camera to the film take-up are all completed and all the systems are again in the reference positions shown in FIG. 1.

The lever 34 which has been rotated clock-wise by the pins 31 and 81 at the take-up step is kept in contact with the pin 31 under the action of a spring even after that. Following the pin 31, the lever 34 moves back (counter-clockwise rotation) and at a position a little before the take-up end position (the position in FIG. 1) the lever 34 engages again with the lever 36 so that a triangle is again formed by the three levers 33, 34, 36.

Hereinafter, the operation for rewinding the film will be described.

Figure 4:
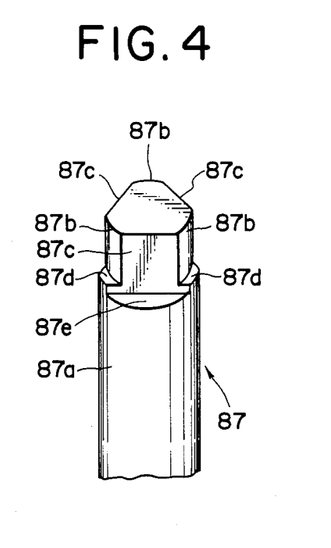
FIG. 4 is an enlarged perspective view of a part of the sprocket shaft.

In this embodiment, the film rewinding is manually carried out. At first the user pushes down an operation button 120 projecting from the top wall of the camera. This depression of the operation button 120 moves the sprocket shaft 87 downwardly. At the upper end of the sprocket shaft 87 there is provided a smaller-diametered portion 87b an enlarged view of which is shown in FIG. 4. As clearly seen in FIG. 4, the circumferential surface of the portion 87b is partly cut off to form three flat surfaces 87c of the same size.

A leaf spring 121 is always in contact with the sprocket shaft. As seen best in FIG. 3, the leaf spring is biased toward the center of the shaft 87. When the shaft 87 is moved down in the manner described above, the lower edge of the leaf spring 121 come into engagement with a step 87d formed by the smaller-diametered portion 87b or with a step 87e formed by the flat surface 87c to inhibit the moving-up of the sprocket shaft.

As previously mentioned, the clutch 88, 89a is disengaged by this downward movement of the shaft 87 and the sprocket 89 is made free. In the position in which the leaf spring 121 inhibits the moving-up of the sprocket shaft as described above, the clutch 88, 89a is kept out of engagement.

In this position, if the motor 1 starts rotating, for example, by the release of the camera, the sprocket shaft 87 is also rotated. By this rotation of the shaft, the leaf spring 121 is disengaged from the step and moved to the larger diameter portion 87a. As the lock is released, the sprocket shaft is allowed to move up by the force of the spring 90. The clutch 88, 89a can now come into engagement.

The film rewinding is possible when the clutch is kept out of engagement and the sprocket is free. Therefore, the user rewinds the film with a rewinding crank (not shown) during that time. During the rewinding operation, the spool is rotated in reverse direction (clockwise) by the film and a spool friction torque by the spring 3 is applied to the gears 80, 86, 91, 92 of the film take-up system. In case that the spool friction torque is large, the motor 1 is undesirably rotated reversely (counter-clockwise) by the friction torque through the sprocket shaft 87, reference shaft 16c and reduction gear train 5 to 15. The rotation of the sprocket by the spool friction torque results in unlocking of the locking leaf spring 121 acting on the shaft, which allows the shaft 87 to move up. Consequently, after that, the film rewinding is impossible. In this embodiment, in order to prevent this trouble, the check lever 83 is provided which inhibits the counterclockwise rotation of the take-up gear 80.

In the check mechanism according to the prior art, a check pawl has been provided which is engageable directly in the tooth of the take-up gear or a particular rachet gear for inhibiting the reverse of the take-up gear has been provided.

However, the prior reverse prevention mechanism has some drawbacks, in that it is difficult to correctly determine the positions corresponding to the unlock points of the sprocket shaft, and a great number of locking points must be considered (the number is almost infinite). In the above embodiment, to overcome the problem, we have made use of the rotation ratio of the take-up gear 80 to the sprocket shaft 87 (the ratio is 3:4). Concretely speaking, four teeth-engagement portions 80b have been provided on the take-up gear 80 and three unlock points 87c have been provided on the sprocket.

In this simple manner, the problem of wrong reset of operation button 120 has been solved in the embodiment.

As previously shown, the positions of the engagement portions 80b correspond to the positions of the step portions 87e on the sprocket shaft 87. The check lever 83 can engage in one of the engagement portions 80b without fail a little before the locking leaf spring 121 has been pushed out from one of the step portions 87e on the sprocket shaft 87. Thus, according to the embodiment, the reset of operation button 120 caused by an accidental reverse (clockwise) rotation of the sprocket shaft is prevented by the minimum number of locking points (engagement portions 80b).

Figure 5:
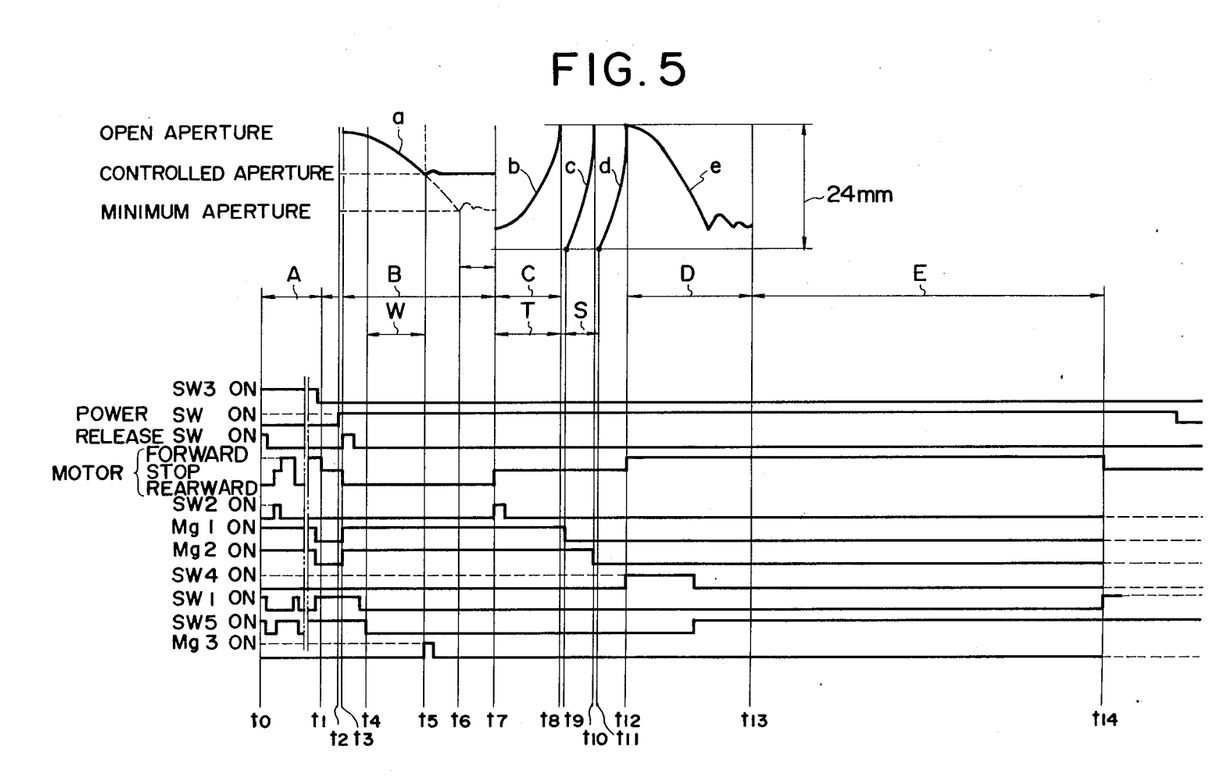
FIG. 5 is a time chart showing the operations of the embodiment.

The sequence of operations for taking a picture will be summarized hereinafter with reference to the time chart shown in FIG. 5.

In the upper part of the time chart there are shown a diaphragm driving curve a, mirror running curves b and e, and shutter running curves c and d. In the lower part there are shown timings of opening and closing of the respective switches.

The operator loads a film in the camera, closes the back lid and depresses the release button.

When the release button is moved down to its second stroke (time point $t_0$), the first and second electromagnets Mg1 and Mg2 attract and hold the leading blades and the trailing blades of the shutter. At the same time, electric power is supplied to the motor 1. In the same manner as the above, the motor 1 starts rotating and the reference shaft 16c repeats the cycle of 105° reverse rotation, stop and 105°+360° forward rotation (the last 360° rotation is for film take-up). At the time when the indication on the counter dial 98 changes to "1" from "S", the switch SW3 is opened (OFF) to stop the motor 1 (time point $t_1$). This period of from $t_0$ to $t_1$ is the film leader take-up period A. In this period, the shutter blades are being held by the attraction of the electromagnets. The shutter blades can not start running.

Thereafter, when the operator depresses the release button only to its first stroke (time point $t_2$), the power source switch (not shown) is closed (ON) and power is supplied to the light-measuring circuit and to the control circuit for the whole camera. Prior to the release of the camera, the light measuring circuit measures the intensity of light. From the output of the measured light and the data of film sensitivity, a combination of aperture value and shutter time necessary for obtaining an optimum exposure is determined and it is displayed in the viewfinder of the camera.

When the release button is further depressed to its second stroke, a release switch (not shown) is closed (ON) for a moment in link with the move-down of the release button to the second stroke (time point $t_3$). At the time ($t_3$), the motor 1 starts rotating reversely. By the above-described mechanism, the aperture is stopped down (curve a).

Immediately before a controlled aperture is given (time point $t_5$), the control circuit stops the aperture control system by a current supply to the aperture control magnet Mg3.

The motor continues to further rotate reversely and passes over the stroke up to the minimum aperture. After that, the mirror-up lever 40 and the charge lever 19 are released from the locking pawl 22 by a further reverse rotation of the motor. Immediately after the unlocking of the pawl 22, the motor 1 stops in response to switch SW2 (time point $t_7$).

Therefore, at the time $t_7$, the turnable mirror 43 starts moving up (curve b) and reaches a position retracted from the picture taking light path (time point $t_8$).

The period of $t_8$ to $t_7$ is the motor reverse period B for driving the diaphragm. During this period B, the reference shaft 16c rotates 105° reversely. The next period of $t_7$ to $t_8$ is the mirror-up period C.

The diaphragm running curve a represents the change of aperture. The down-slope of the curve means that the aperture is gradually stopped down. The mirror moving curves b and e represent the amount of movement of the forward end point of the turnable mirror 43 relative to time.

As previously mentioned, in the present embodiment, a light remeasurement is carried in which the intensity of light transmitted through the controlled aperture is measured and the measured value is memorized in response to switch SW2 (time point $t_7$). From the output value of the light remeasurement, the shutter time is redetermined including a correction of exposure value for compensating the aperture control error if any. The period of $t_5$ to $t_7$ is the light remeasurement period. In the light measurement period, the time from $t_6$ to $t_7$ is that for light remeasurement at the minimum aperture.

In the present embodiment, the signal of switch SW2 is used also as a trigger signal. By means of the trigger signal, after the lapse of a certain determined time T, the current supply to the leading blade-holding magnet Mg1 is cut off to allow the leading blades to start running (time point $t_9$). The curve c shows the movement of the leading blades running over a 24 mm aperture.

The current supply to the two shutter blade-holding magnets Mg1 and Mg2 has been started in response to a signal from the release switch (not shown) (at $t_3$) and the shutter blades have been held by the magnets since that time ($t_3$). After the lapse of a certain controlled shutter time S from the start of the leading blades, the exposure control circuit (not shown) cuts off the current supply to the trailing blade-holding magnet Mg2 (time point $t_{11}$). The trailing blades start running and a desired slit width is obtained between the leading and trailing blades. The curve d shows the running of the trailing blades of the shutter.

When the running of the trailing blades is completed (time point $t_{12}$), a trailing blade switch SW4 (not shown) is closed (ON) and the motor 1 rotates forwardly in response to a signal from the switch. With this forward rotation of the motor 1, the mirror-down step (curve e) is carried out.

Also, the shutter charge is performed at this step. The period of $t_{12}$ to $t_{13}$ is the motor forward period D for mirror-down and shutter charge. During this forward period D, the reference shaft 16c rotates 105° forwardly.

After the end of the mirror-down ($t_{13}$), the motor 1 continue to further rotate forwardly and enters the film take-up period E. In this period, the reference shaft 16c is rotated one revolution (360°) to take up one frame of film on the spool 2. At the completion of one frame of film, the take-up gear 80 is stopped by the lever 82 and the switch SW1 is closed (ON) at the same time. Thereby, the motor 1 is stopped (time point $t_{14}$).

By a sequence of operations described above, an exposure on one frame of film and take-up of the exposed frame of film are all completed. This is the operation sequence in ordinary programmed exposure control mode.

Hereinafter, the manner of operation for taking a picture using a flash light device and the sequence of operations will be described.

In the present embodiment of the invention, the programmed exposure control is carried out according to the so-called light intensity feedback method. According to the method, the intensity of light transmitted through the aperture is continuously measured and the measured light value is continuously fed back to the aperture control circuit to adjust the aperture to a desired optimum value.

The feedback method has an advantage that the aperture can be controlled measuring the light transmitted through the actually existing lens. However, on the other hand, it has a disadvantage that when the intensity of the light from the object is low, the accuracy of the control is low due to the noise on the sensor for receiving the light and degradation of response. Therefore, although it is useful for photographing in ordinary program mode, the feedback method can not be used for photographing in the so-called program-and-flash mode in which the aperture is automatically set to a proper value for taking a picture of an object of low illuminance with flash light.

According to the invention, to solve this problem, control data is stored in the exposure control unit. The control data contains information about the relation between the running time of the lens diaphragm of lens and the aperture value. The control unit automatically identifies the lens then used, reads the control data (table) related to the lens and controls the aperture based upon the data.

Figure 6:
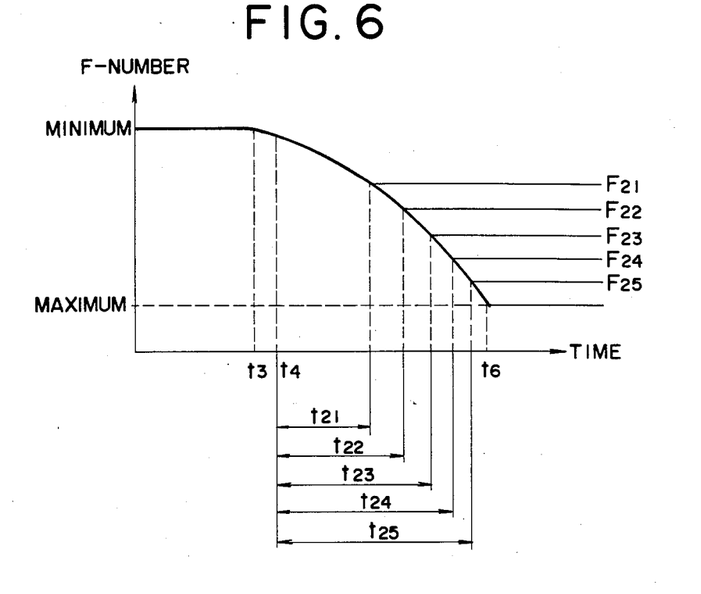
FIG. 6 is a diagram showing the movement of the aperture stop.

FIG. 6 is a representative characteristic curve of running of a diaphragm for a photographing lens, plotted with the aperture value as the ordinate and the time as the abscissa.

As previously mentioned, the diaphragm for the lens 100 is usually biased by a spring 102 tending to stop down the lens aperture. When the diaphragm lever 41 is moved from the open aperture position, the diaphragm is accelerated with time and, as seen in FIG. 6, the aperture is stopped down at the accelerated speed. At the end of the aperture control stroke, the diaphragm lever 41 is stopped by a minimum aperture limiter. In the case of the example shown in FIG. 6, it is seen that the time required to reach the aperture of F21 from start is $t_{21}$ and the time required to reach F22 is $t_{22}$.

In the embodiment, the aperture control is carried out making use of the above relation. However, as many different lenses are available, there may be such case that lenses have no similarity to each other in the relation between aperture value (Fn) and running time (tn). In this case, it may be needed, for example, to provide each lens with a data memory means and control the aperture making by access to the data for every exchangeable lens from the camera body side.

In the present embodiment, however, the control data is used assuming that the lenses having the same minimum F-number have approximately the same running characteristic of the diaphragm as that shown in FIG. 6.

The control data used in the embodiment are, therefore, classified by minimum F-number. Such control data are previously stored in the control unit on the camera body side. Thus, for the same minimum F-number of the lens mounted on the camera, the same aperture control is carried out by the camera. This aperture control method according to the invention has advantages over the prior art that the lens can be identified by its minimum F-number only and that the data to be memorized in the control unit on the camera body side are not so much. However, as a matter of course, it is to be understood that this aperture control is possible only when the lenses having the same minimum F-number all have approximately the same running characteristic curves of the diaphragm (the curve shown in FIG. 6) and they may be controlled by the same control reference data without any trouble in practice.

When the above aperture control method is employed for program-and-flash mode, the aperture value for photographing with flash light is determined depending on film sensitivity, object distance and the guide number of flash light device GN. Therefore, if the intensity of flash light is controlled based on the light reflected from the object and transmitted through the aperture of the picture taking lens, only the film sensitivity is the parameter for determining the aperture value after setting the maximum reach of the flash light.

Concretely, in this mode, the control reference data are determined using, as the standard flashlight device, a TTL flash output control Strobo of the guide number GN=25 and assuming that the common object distance for picture-taking with flash light is 0.8 to 4.5 m. Under the condition, the aperture is so determined that when the film sensitivity ISO is 100, the aperture is set to F 5.6. And the control reference table is so made that in order to keep the above object distance, when the film sensitivity is increased by one step, the aperture value is stopped down one more step.

Figure 7:
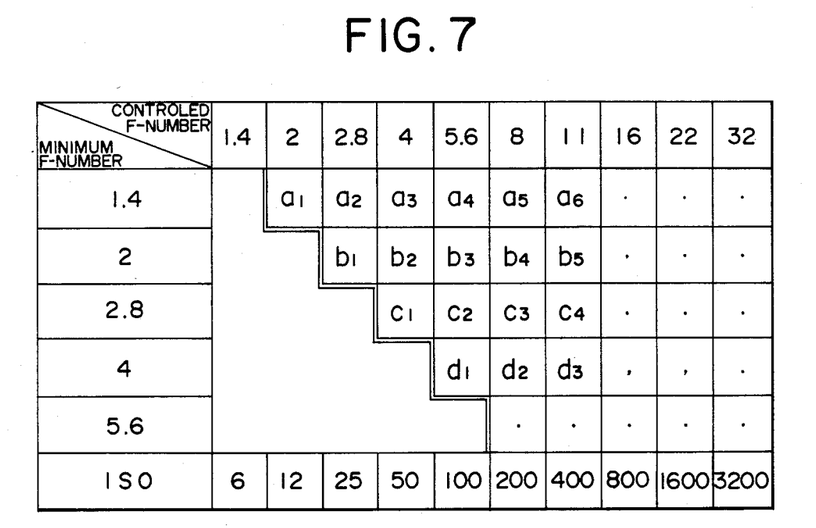
FIG. 7 is a time table showing the data for aperture control.

FIG. 7 shows an example of the aperture control reference table prepared according to the above principle. The table previously stored in the control unit within the camera body corresponds to it in content.

In the table, there are summarized controlled F-numbers as controlled variables determined from minimum F-numbers and film sensitivity, and diaphragm running times Tw required to obtain the controlled aperture values. Reference values $a_1, a_2, \ldots, b_1, b_2 \ldots, c_1, c_2 \ldots, d_1, d_2 \ldots$ are these diaphragm running times Tw which correspond to the period D in FIG. 5.

For example, when the lens mounted on the camera is a lens of minimum F-number=F 1.4 and the sensitivity of the film loaded in the camera is ISO 100, a reference value $a_4$, is read from the table. Estimating the diaphragm running time from the reference the aperture is controlled to F 5.6. If the film is replaced by a film of ISO 200, then the corresponding reference value is $a_5$ and from it the aperture is controlled to F 8. If the lens is replaced by one of a different minimum F-number from the former, the aperture is controlled to the same aperture value as the former so long as the film sensitivity remains unchanged. For the same film sensitivity, lenses having different minimum F-numbers are all controlled to the same aperture value from the respective reference values in the table in FIG. 7. For example, when there is used the same film of ISO=100, the reference value for the lens of minimum F-number=F 1.4 is $a_4$ and that for the lens of minimum F-number=F 2 is $b_3$. The controlled F-numbers given from the two reference values $a_4$ and $b_3$ are the same F 5.6.

When the aperture control is carried out by controlling the diaphragm driving time from the camera release to the desired aperture diameter in accordance with the above time table, some difficulties arise rise particularly in cameras of the type in which the aperture is controlled through the driving of the motor.

The motor driving voltage between terminals is variable within a certain range (6 V ~4.5 V), which causes a change in rising characteristic, driving force and rotational speed of the motor. In this case, the time table of the time from release to controlled aperture value changes accordingly.

To overcome the difficulty, in the present embodiment, a pass point (time point $t_4$ in FIG. 5) is particularly set at a point near the open aperture. A time table is prepared based on the time from the pass (check) point to the controlled aperture diameter (period W in FIG. 5) and the time table is used in the embodiment. For the present embodiment, the pass (check) point has been set at a point about ½ stopped down from the open aperture. Further, a slide switch SW5 has been provided which is opened (OFF) at the check point. In response to the opening (OFF) of the switch SW5, the control unit generates an instruction to start the stop-down operation.

In order correctly to control the time from the check point to the controlled aperture value it is essential to keep constant the slope angle of the diaphragm running curve. Change of the slope angle caused by any variation of driving voltage between terminals of the motor must be excluded. Therefore, it is necessary for the mechanical diaphragm driving mechanism to be constructed taking this into consideration as will be described later.

As previously mentioned, the data of the time table used in the embodiment have been classified into groups regarding the minimum F-number of interchangeable changeable lenses. At present, many interchangeable lenses having different combinations of focal length and minimum F-number are available. However, the diaphragm driving time per aperture stop-down step is determined for every group of lenses roughly from the minimum F-number only.

Referring again to FIG. 1, we will, hereinafter, describe the mechanical mechanism for controlling the diaphragm driving time.

The manner of operations of diaphragm driving, holding of controlled aperture value, shutter control, film take-up etc. previously described for photographing in programmed exposure control mode are all applicable also to the photographing with flash light.

The motion of the diaphragm is transmitted to the lever 130 from the diaphragm control lever 41 through the interlocked lever 48 and the driving shaft 53. The lever 130 has an electroconductive slide contact 131. Interlocked with the lever 130, the slide contact 131 slides on a switch plate 134. On the substrate 134 there are formed electroconductive patterns 132 and 133.

In the open aperture position, the two patterns 132 and 133 are short-circuited through the slide contact 131. When the diaphragm is actuated and the aperture is stopped down nearly to ½ step from the open aperture, the patterns 132 and 133 are electrically isolated from each other as the result of move-out of the slide contact 131.

Starting from the above time point, the control unit 135 controls the diaphragm driving time in accordance with the time table shown in FIG. 7.

The control unit discriminates flash light mode from daylight mode by the connect-in of the power source of a flash device, the completion of electric charge on a flash device or automatic setting of a shutter time suitable for photographing with flash light. After the discrimination, the control unit 135 makes itself ready for aperture control in place of the aperture control circuit for the programmed exposure control mode described above.

In response to the opening (OFF) of the switch SW5, the control unit 135 starts counting time. Immediately before a desired aperture value is obtained, the control unit terminates counting and generates an instruction for current supply to the diaphragm control magnet Mg3. Thereby the aperture stop-down is terminated.

The control unit 135 is always reading the minimum F-number of the lens mounted on the camera as well as the sensitivity of the film loaded in the camera. From the minimum F-number of the lens, the control units judges the running characteristic curve of the diaphragm of the interchangeable lens mounted (the above-shown characteristic curve of diaphragm running/stop-down time). And the control unit determines a value to which the aperture of the lens should be controlled (controlled aperture) from the information of the film sensitivity. From these inputs, the control unit computes the time required to reach a point immediately before the controlled aperture value starting from the time point when the aperture has been stopped down by ½ step (time point $t_4$ in FIG. 5).

In accordance with the time given by the above computation (one of the reference values in FIG. 7), the control unit 135 carries out the aperture control in the manner described above. As a modification, it is also possible to obtain a time control signal from the operation of the lever 39 or the like and to carry out the time control of the diaphragm while starting the time-counting from the start of aperture stop-down from the open aperture.

In the present embodiment, since the driving force of the motor 1 is transmitted to the diaphragm driving system 41 through the diaphragm driving spring 46, the possible variation of the driving force resulting from any change in voltage may be absorbed by the spring 46. The driving force of the motor 1 is accumulated in the spring 46 and the diaphragm is driven by the accumulated energy. Therefore, it is possible to minimize the variation of the diaphragm driving time required to obtained a determined aperture value.

Although the variation of the diaphragm driving time can be minimized by the above-described method, if there is still a minute diffrence in the closing (OFF) timing of the switch SW5 among cameras, some adjustment is needed. The adjustment may be made in various manners. For example, it may be made by mechanically adjusting the switch SW5. In this embodiment, however, the adjustment is made electrically by converting the voltage on the terminal of a resistor in A/D conversion and converting the digital value into an adjusting time $\Delta t$ which is then added to or subtracted from the corresponding reference control time as shown in FIG. 7.

Figure 8:
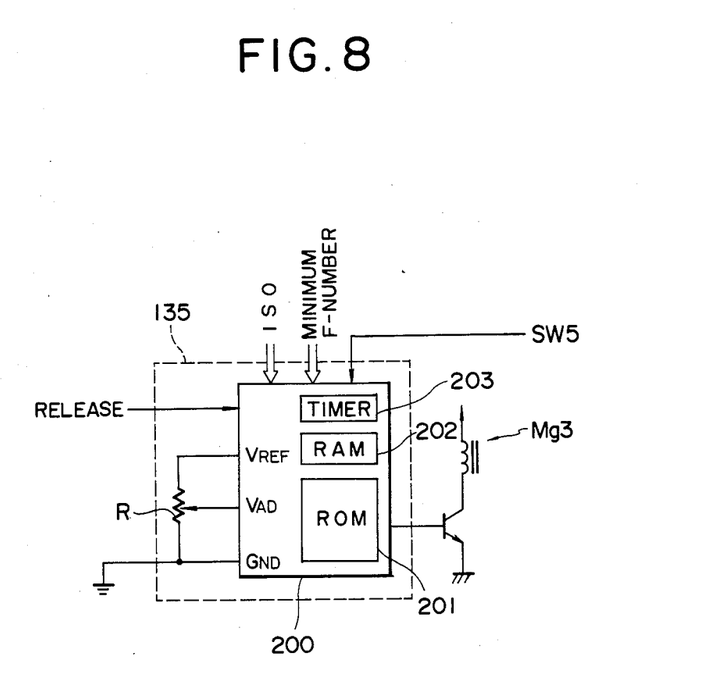
FIG. 8 is a block diagram of a controller using a microcomputer.

This adjusting method will be described hereinafter with reference to FIG. 8 showing an embodiment thereof in which a micro-computer with A/D converter has been used for the sake of simplification.

In FIG. 8, the reference numeral 200 generally denotes a micro-computer. VREF is a reference voltage of A/D converter. The micro-computer carries out A/D conversion of the voltage ranging from GND to VREF as the full scale.

For example, when the A/D converter has an 8-bit resolving power, an input voltage VAD is so converted that the level of VREF corresponds to 256. In this case, the A/D converted value changes in the range of 0 to 255 by a stop-down time adjusting resistor R. The A/D converted value determined by the resistance R is software—technically converted into a $+/-$ adjusting time. The adjusting time is added to or subtracted from a selected reference control time to obtain an adjusted control time. In accordance with the adjusted control time, the diaphragm running time is controlled.

In this manner, a fine adjustment by a resistor is possible to the diaphragm running time. Any difference in diaphragm control time among cameras can be adjusted in this method of fine adjustment.

The conversion of A/D converted value VAD into adjusting time $\Delta t$ may be carried out, for example, in the following manner:

The middle value of the A/D conversion full scale 256 is 128. The middle value 128 used as a reference value. When VAD is larger than 128, the computer subtracts 128 from VAD. When VAD is smaller than 128, the computer subtracts VAD from 128. The value thus obtained is converted into an adjusting time $\Delta t$ by a suitable scaling of adjusting time per LSB (for example, with the conversion ratio of 10 $\mu$s/LSB). The adjusting time $\Delta t$ is added to or subtracted from the selected reference time as shown in FIG. 7.

Figure 9:
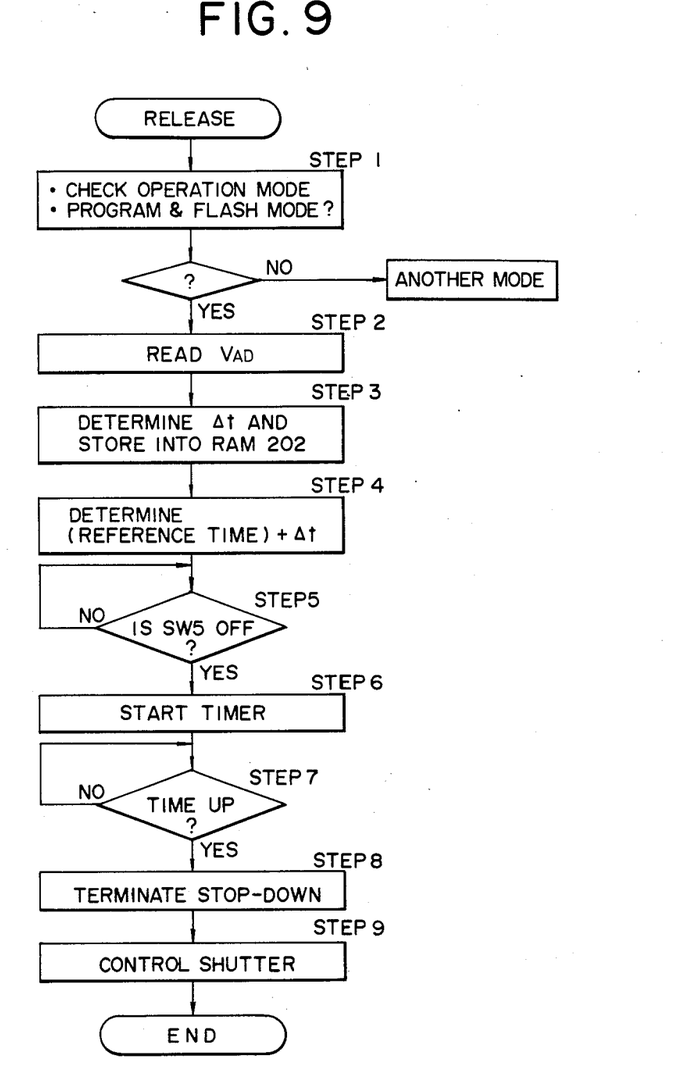
FIG. 9 is a flow chart of the control operations of the controller shown in FIG. 8.

The operation steps described above are summarized in a software flow chart in FIG. 9. The control program for executing the flow chart is stored in a ROM of the micro-computer shown in FIG. 8. When a signal is inputted to the micro-computer in response to a depression of the release button up to the second stroke, an aperture control is started in accordance with the control flow shown in FIG. 9.

The ROM 201 of the micro-computer has memorized therein all of the time table shown in FIG. 7. As previously mentioned, the micro-computer always has inputs of film sensitivity and minimum F-number and selects a most suitable diaphragm control time for flash light photographing in accordance with the inputs. A RAM 202 is provided to memorize information corresponding to the diaphragm control time. Therefore, when a picture-taking is performed in the program-and-flash mode, the operation steps for it are executed in the following sequence:

When the release button is depressed, a release signal is applied to the micro-computer. At the first step, it is checked whether the operation mode is the program-and-flash mode or not. Concretely speaking, this discrimination is made by checking whether or not the power source of the flash device is closed (ON) or whether or not the set shutter time is a value suitable for photographing with flash light. If the operation mode is not the flash light photographing mode, the control flow is directed to another mode, for example, to the ordinary programmed mode described above. If the operation mode is the program-and-flash mode, the flow proceeds to the second step, Step 2. The micro-computer reads the voltage set by the adjusting resistor R and carries out A/D conversion of the voltage. A converted value VAD is obtained.

At the next step, Step 3, the micro-computer computes an adjusting time $\Delta t$ from the converted value VAD. The adjusting time $\Delta t$ is memorized in RAM 202. Thereafter, the control step proceeds to the fourth step, Step 4.

At Step 4, the micro-computer reads out information of a most desirable aperture control reference time (one of the above-mentioned reference control values, $a_1$, $a_2$ ..., $b_1$, $b_2$ ..., $c_1$, $c_2$ ..., $d_1$, $d_2$ ...) as well as information of the adjusting time $\Delta t$ from the RAM 202. By adding the adjusting time $\Delta t$ to the reference time (according to the case, by a subtraction), the micro-computer computes an adjusted time, that is, an actually controlled diaphragm running time TW.

At the next step, Step 5, the micro-computer checks whether an aperture stop-down operation is started or not. More specifically it is checked whether the slide switch SW5 is OFF. When it is OFF, the control proceeds to the sixth step, Step 6. At this step, the micro-computer sets the adjusted diaphragm running time TW on the timer 203 and makes the timer start counting time. At the next step, Step 7, the mirco-computer waits for time-up by the timer 206.

After the time-up by the timer, the control step proceeds to the eighth step, Step 8. A current is supplied to the diaphragm control magnet Mg3 to terminate the aperture stop-down operation.

At the ninth step, Step 9, the micro-computer controls the leading and trailing shutter blade holding magnets Mg1 and Mg2 to open and close the shutter.

In this manner, a picture-taking with flash light is completed.

While the invention has been particularly shown and described with reference to preferred embodiments thereof, it will be understood that various changes and modifications may be made within the scope of the invention.

For example, in the above embodiment, the control of diaphragm running time has been made by use of a timer 203 built in the micro-computer. However, the control may be made also using the software of the micro-computer instead of the timer.

Also, in the above embodiment, the aperture control system has been changed over to the time control system only for the program-and-flash mode. But, it is to be understood that the time control system is applicable also to the aperture control in the programmed exposure control mode.

Further, while in the above embodiment, the cam surface of the cam 16 has been particularly designed to moderate the retraction running speed of the arm 110, the same effect may be attained by particularly designing the cam surface 20a of the cam 20.

The scope of the invention, therefore, is to be determined solely by the following claims.

We claim:

1. A control apparatus for a camera, comprising:
   an electric motor;
   means for sequentially driving said motor at first, second and third stages of rotation so that said motor is rotated in one direction in response to a picture-taking operation at said first stage, in the opposite direction in response to the completion of an exposure at said second stage, and in said opposite direction subsequent to said second stage at said third stage;
   a shutter-charging member movable from an initial position to a charge position in order to charge a shutter-driving mechanism;
   a mirror-operating member disposed to move a movable mirror between a position for through-finder observation and a position for exposure;
   diaphragm-operating means for moving a diaphragm of a photographing lens between an open aperture position and a stop-down aperture position;
   a film feed member for taking up a film stepwise frame by frame; and
   interlocking means for operationally connecting said shutter-charging member, mirror-operating member, diaphragm-operating member and film feed member, respectively, with said motor, and disposed to move said diaphragm to the stop-down aperture position, said shutter-charging member to the initial position and said movable mirror to the exposure position during said first stage of the rotation, to move said diaphragm to the open aperture position, said shutter charging member to the charge position and said mirror to the through-finder observation position during said second stage of the rotation, and further, during the third stage of the rotation, to take up the film.

2. A control apparatus for a camera according to claim 1, wherein said interlocking means includes a cam surface and a cam follower disposed between said motor and said shutter-charging member.

3. A control apparatus for a camera according to claim 1, wherein said interlocking means includes cam means interlocked with said motor; a rocking member for reciprocal movement following said cam means; and a connection member disposed between said rocking member and said shutter-charging member for moving said shutter-charging member to the charge position and to the initial position interlocking with the forward movement and backward movement of said rocking member respectively.

4. A control apparatus for a camera according to claim 1, wherein said interlocking means includes rocking means disposed between said motor and said mirror-operating member and between said motor and said diaphragm-operating member, said rocking means moving forwardly in response to said first rotation stage of said motor and backwardly in response to the second rotation stage of said motor.

5. A control apparatus for a camera according to claim 4, said rocking means including a rocking axis, a first member for rocking about said axis, a second member connectable with said first member and a third member for disconnecting said second member from said first member, and wherein said interlocking means further includes operation means for connecting said first and second members together by said third member during the first and second rotation stages of said motor and for operating said third member in such manner as to allow said first and second members to move independently of each other during the third rotation stage of said motor.

6. A control apparatus for a camera, comprising:
   a photographing lens having a diaphragm member movable between a maximum aperture position and a minimum aperture position;
   drive means for stopping down said diaphragm member from said maximum aperture position toward said minimum aperture position;
   memory means for memorizing data representing a relation between the position of said diaphragm member and time;
   means for determining an aperture value;
   means for starting the operation of said drive means;
   means for determining, on the basis of said data, a time necessary for said diaphragm member to be stopped down to a position corresponding to the determined aperture value; and
   diaphragm control means for terminating the stopping down of said diaphragm member when said determined time has elapsed.

7. A control apparatus for a camera according to claim 6, wherein said stop-down means includes an electric motor and a member driven by said motor to move the diaphragm member.

8. A control apparatus for a camera according to claim 6, wherein said starting means generates said start signal after said diaphragm member has been stopped down by a determined amount from the maximum aperture position.

9. A control apparatus for a camera according to claim 6, wherein said diaphragm control means includes time counter means for counting said determined time and terminates said stopping down in response to said time counter means.

10. A control apparatus for a camera according to claim 9, wherein said starting means generates a start signal and said time counter means starts counting in response to said start signal.

11. A control apparatus for a camera according to claim 6 further comprising means for introducing information relating to said photographing lens from said photographing lens and means for reading out said data from said memory means on the basis of said information.

12. A control apparatus for a camera according to claim 11, wherein said information relates to a minimum F-number of said photographing lens.

13. A control apparatus for a camera, comprising:
   shutter charging means for charging a shutter-driving mechanism;
   mirror operating means disposed to move a movable mirror between a position for through-finder observation and a position for exposure;

diaphragm-operating means for moving a diaphragm of a photographing lens between an open aperture position and a stop-down aperture position;

film feed means for taking up a film stepwise frame by frame;

an electric motor;

means for sequentially driving said motor at first, second and third stages of rotation so that said motor is rotated in response to a picture-taking operation at said first stage, in response to the completion of an exposure at said second stage and subsequent to said second stage at said third stage;

means for connecting during said first stage said motor with said mirror operating means to move said mirror from the through-finder observation position to the exposure position and with said diaphragm operating means to move said diaphragm from the open aperture opsition to the stop-down aperture position;

means for connecting, during said second stage, said motor with said mirror operating means to move said mirror from the exposure position to the through-finder observation position and with said diaphragm operating means to move said diaphragm from the stop-down aperture position to the open aperture position;

means for connecting said motor with said film feed means to take up said film during said third stage; and means for connecting said motor with said shutter-charging means to charge said shutter-driving mechanism during said second stage.

14. A control appartaus for a camera according to claim 13, wherein said sequentially driving means drives said motor in one direction at said first stage and in the opposite direction at said second and third stages.

15. A control apparatus for a camera, comprising:
a photographing lens having a diaphragm member movable between a maximum aperture position and a minimum aperture position;

means for determining an aperture value;

drive means for stopping down said diaphragm member from said maximum aperture position toward said minimum aperture position;

means for determining a time necessary for said diaphragm member to be stopped down to a position corresponding to the determined aperture value; and diaphragm control means for terminating the stopping down of said diaphragm member when said determined time has elapsed.

16. A control apparatus for a camera according to claim 15, wherein said diaphragm control means includes time counter means for counting said determined time and terminates said stopping down in response to said time counter means.

17. A control apparatus for a camera according to claim 16 further comprising means for triggering said drive means to start said stopping down of said diaphragm member and wherein said time counter means starts counting in response to said triggering means.

18. A control apparatus for a camera according to claim 17, wherein said triggering means generates a start signal after a predetermined delay time from the start of said stopping down.

19. A control apperatus for a camera, comprising:
mirror operating means disposed to move a movable mirror between a position for through-finder observation and a position for exposure;

diaphragm-operating means for moving a diaphragm of a photograping lens between an open aperture position and a stop-down aperture position;

film feed means for taking up a film stepwise frame by frame;

an electric motor; and transmission means for transmitting rotation of said motor to said mirror operating means, said diaphragm-operating means and said film feed means;

said transmission means including a first member engaged with said mirror operating means and said diaphragm-operating means, a second member provided to be displaced by said motor, and a clutch member operable for engaging and disengaging said first member with respect to said second member;

said first member being displaced by said second member for moving said mirror and said diaphragm when said clutch member is operated to engage said first member with said second member, and being free from said second member when said clutch member is operated to disengage said first member from said second member.

20. A control apparatus for a camera according to claim 19 further comprising means for operating said clutch member so as to disengage said first member from said second member when said film is taken up by said film feed means.

21. A control apparatus for a camera according to claim 19, wherein said first member and said second member are disposed for rotation about a common axis and said clutch member releasably engages said first member and said second member for joint rotation about said common axis.

* * * * *